United States Patent
Momose

(10) Patent No.: US 11,067,525 B2
(45) Date of Patent: Jul. 20, 2021

(54) ELECTRICAL CONDUCTIVITY METER

(71) Applicant: Azbil Corporation, Tokyo (JP)

(72) Inventor: Osamu Momose, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 696 days.

(21) Appl. No.: 15/905,144

(22) Filed: Feb. 26, 2018

(65) Prior Publication Data

US 2018/0246050 A1    Aug. 30, 2018

(30) Foreign Application Priority Data

Feb. 27, 2017   (JP) .............................. JP2017-034920

(51) Int. Cl.
*G01N 27/08* (2006.01)
*G01N 27/04* (2006.01)

(52) U.S. Cl.
CPC ........... *G01N 27/08* (2013.01); *G01N 27/045* (2013.01)

(58) Field of Classification Search
CPC ...... G01N 27/045; G01N 27/08; G01F 1/588; G01F 1/60
See application file for complete search history.

(56) References Cited

U.S. PATENT DOCUMENTS

| | | | | |
|---|---|---|---|---|
| 5,625,155 A | * | 4/1997 | Yoshida .................. | G01F 1/002 73/861.11 |
| 2006/0196817 A1 | * | 9/2006 | Crewson .................. | C02F 1/48 210/223 |
| 2007/0044572 A1 | * | 3/2007 | Davis ...................... | G01F 1/704 73/861.42 |
| 2008/0053241 A1 | * | 3/2008 | Kappertz ................ | G01F 1/588 73/861.12 |
| 2017/0295743 A1 | * | 10/2017 | Brown ...................... | A01J 5/01 |

FOREIGN PATENT DOCUMENTS

| | | |
|---|---|---|
| CN | 103884747 A | 6/2014 |
| JP | H07-15490 A | 1/1995 |
| JP | 2002-296312 A | 10/2002 |
| JP | 2005-148007 A | 6/2005 |

OTHER PUBLICATIONS

The State Intellectual Property Office of People's Republic of China, "First Office Action", issued in Chinese Patent Application No. 201810159469.8, which is a counterpart to U.S. Appl. No. 15/905,144, dated Apr. 28, 2020, 19 pages (10 pages of English Translation of Office Action and 9 pages of Original Chinese Office Action).

* cited by examiner

*Primary Examiner* — Son T Le
*Assistant Examiner* — Adam S Clarke

(57) ABSTRACT

An electrical conductivity meter comprises a measurement tube formed of an electrical insulation material and through which a fluid of a measurement target flows, a first electrode formed on an outer peripheral surface of the measurement tube, a second electrode connected to a common potential and in contact with the fluid, a resistor in which one end is connected to the first electrode, a voltage detecting portion that detects voltages of a signal generated in the first electrode due to an input of an AC signal to the other end of the resistor, and an electrical conductivity calculating portion that calculates an electrical conductivity of the fluid based on an amplitude of the voltages detected by the voltage detection circuit.

16 Claims, 9 Drawing Sheets

ELECTRICAL CONDUCTIVITY METER

CROSS-REFERENCE TO RELATED APPLICATION

The present application claims the benefit of and priority to Japanese Patent Application No. 2017-034920, filed on Feb. 27, 2017, the entire contents of which are incorporated by reference herein.

TECHNICAL FIELD

The present invention relates to an electrical conductivity meter that measures an electrical conductivity of a fluid in various process systems.

BACKGROUND ART

A two-electrode type electrical conductivity meter is known as an apparatus that measures an electrical conductivity (so-called conductivity) of a fluid. The two-electrode type electrical conductivity meter is a measurement apparatus for obtaining the electrical conductivity of the fluid by applying an AC signal, such as a sine wave or a square wave, between two electrodes and measuring a current flowing between the electrodes. PTL 1 to PTL 3 disclose the related art of the two-electrode type electrical conductivity meter.

For example, PTL 1 discloses a two-electrode type electrical conductivity meter that measures an electrical conductivity from electrical resistance of a liquid of a measurement target by detecting a current flowing into the other electrode when an AC voltage is applied to one electrode in a state where the two electrodes are immersed in the liquid of the measurement target.

PTL 2 and PTL 3 disclose two-electrode type electrical conductivity meters in which two electrodes are formed in a rod shape.

CITATION LIST

Patent Literature

[PTL 1] JP-B-7-15490
[PTL 2] JP-A-2005-148007
[PTL 3] JP-A-2002-296312

SUMMARY

However, according to a study of the present inventor, it becomes clear that there are the following problems in the two-electrode type electrical conductivity meters disclosed in PTL 1 to PTL 3 described above.

In the electrical conductivity meters disclosed in PTL 1 to PTL 3, it is necessary to immerse the two electrodes to a measurement target fluid in order to measure the electrical conductivity. For this reason, in a case where a foreign matter adheres to a surface of the electrode or the surface of the electrode corrodes, an error in a measured value due to a change in polarization capacitance may occur.

In particular, since the electrical conductivity meters having the rod-shaped electrode disclosed in PTL 2 and PTL 3 have a small contact area of the electrode in contact with the measurement target fluid, in the case where the adhesion of the foreign matter or the corrosion occurs in the electrode, an area of the portion increases with respect to the entire area of the electrode, and the measurement error due to the change in the polarization capacitance may increase.

As a countermeasure for preventing the adhesion of the foreign matter or the corrosion of the electrode, it is known that "platinum black" is used as a metal configuring the two electrodes. However, since platinum black is an expensive metal, there is a problem that the manufacturing cost of the electrical conductivity meter is high in a case of using the platinum black as the electrode.

When the electrical conductivity of a liquid flowing in a pipe is measured using the electrical conductivity meter having the rod-shaped electrode disclosed in PTL 2 and PTL 3, it is necessary to insert the rod-shaped electrode into the pipe. At the time, in a case where the pipe is comprised of a metal material, unless the pipe and the electrode are disposed as far as possible, the measurement error may occur due to a current flow from the electrode to the pipe.

The present invention is made in view of the above problems, and a purpose of the present invention is to realize a highly accurate two-electrode type electrical conductivity meter at a low cost.

An electrical conductivity meter (100) according to the present invention comprises a measurement tube (1) which is formed of an electrical insulation material and through which a fluid of a measurement target flows, a first electrode (2) formed on an outer peripheral surface of the measurement tube, a second electrode (3) connected to a common potential (Vcom) and in contact with the fluid, a resistor (R1) of which one end is connected to the first electrode, a voltage detecting portion (5) that detects voltages (VH and VL) of a signal (V2) generated in the first electrode due to an input of an AC signal (V1) to the other end of the resistor, and an electrical conductivity calculating portion (62 and 62A) that calculates an electrical conductivity of the fluid based on an amplitude (VH−VL) of the voltages detected by the voltage detecting portion.

In the electrical conductivity meter, the voltage detecting portion may comprise a first sample hold circuit (51) for sampling and holding a voltage (VH) of a signal generated in the first electrode in a first period (Tp) in which the AC signal has a first polarity and a second sample hold circuit (52) for sampling and holding a voltage (VL) of a signal generated in the first electrode in a second period (Tn) in which the AC signal has a second polarity opposite to the first polarity, and the electrical conductivity calculating portion may calculate the electrical conductivity of the fluid based on the voltage (VH) sampled by the first sample hold circuit and the voltage (VL) sampled by the second sample hold circuit.

The electrical conductivity meter may further comprise a storing portion (63) that stores a look-up table (630) indicating a correspondence relationship between the amplitude of voltages detected by the voltage detecting portion and the electrical conductivity of the fluid. The electrical conductivity calculating portion may read the electrical conductivity of the fluid corresponding to a value of the amplitude of the voltages detected by the voltage detecting portion from the look-up table stored in the storing portion.

In the electrical conductivity meter, the second electrode may be a pipe-shaped joint (3A) formed of a metal, of which one end is connected to the measurement tube and the other end is connectable to an external pipe.

The electrical conductivity meter may further comprise a shield cover (21) formed of a metal and disposed to face at least a part of the first electrode.

In the above description, as an example of configuration elements of the invention, reference numerals and signs on drawings corresponding to the configuration elements are described with parentheses.

According to the present invention, it is possible to realize a highly accurate two-electrode type electrical conductivity meter at a lower cost.

DETAILED DESCRIPTION

Figure 1:
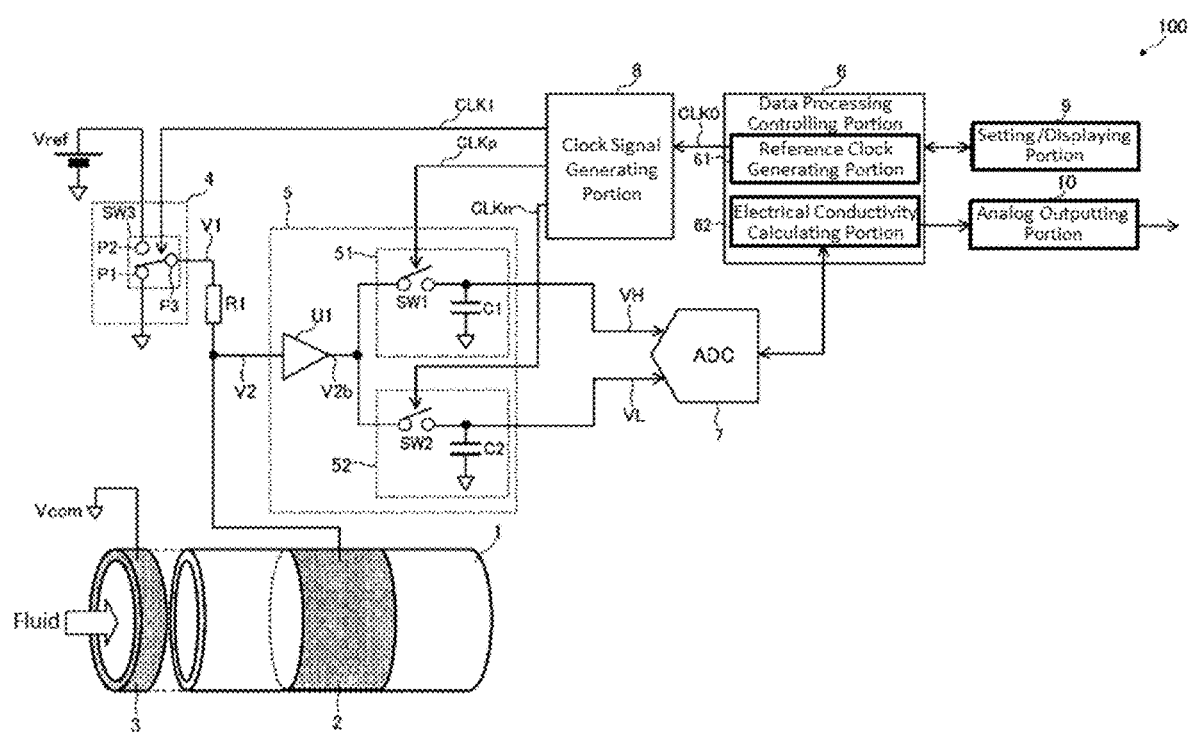
FIG. 1 is a diagram illustrating a configuration of an electrical conductivity meter according to one embodiment of the present invention.

Hereinafter, an embodiment of the present invention will be described with reference to the drawings. In the following description, the same reference numeral and sign will be assigned to a common configuration element in each embodiment, and repeated description will be omitted.

<Configuration of Electrical Conductivity Meter According to the Embodiment>

FIG. 1 is a diagram illustrating a configuration of an electrical conductivity meter according to one embodiment of the present invention.

An electrical conductivity meter 100 illustrated in the figure is a measurement apparatus for measuring electrical conductivity of a fluid flowing in a measurement tube by a two-electrode type. Here, the fluid described above is, for example, a liquid. The electrical conductivity meter 100 has a configuration capable of measuring the electrical conductivity without making one of two electrodes come into contact with a fluid of a measurement target (measurement target fluid).

Specifically, the electrical conductivity meter 100 comprises a measurement tube 1, a first electrode 2, a second electrode 3, an AC signal generation portion 4, a voltage detecting portion 5, a data processing controlling portion 6, an analog/digital converting portion (ADC) 7, a clock signal generating portion 8, a setting/displaying portion 9, and an analog outputting portion 10 as main function portions.

The measurement tube 1 is a pipe through which the fluid of the measurement object (measurement target fluid) of the electrical conductivity flows. The measurement tube 1 is comprised of an electrical insulation material. As the electrical insulation material, it is preferable that a material has a relatively high electrical insulation property, for example, ceramic.

The first electrode 2 is comprised of a metal material formed on an outer peripheral surface of the measurement tube 1. The first electrode 2 is formed of, for example, a thin film-shaped metal material (for example, copper foil), and extends in a circumferential direction of the measurement tube 1 in a partial region of the measurement tube 1. The first electrode 2 and the measurement tube 1 are joined by, for example, an adhesive. Since the measurement target fluid flows through the inside of the measurement tube 1, the first electrode 2 does not contact the measurement target fluid. Hereinafter, the first electrode 2 is also referred to as "non-contact electrode 2".

The second electrode 3 is an electrode which is connected to common potential Vcom and is in contact with the measurement target fluid. For example, as illustrated in FIG. 1, the second electrode 3 is comprised of a pipe-shaped metal material connected to the measurement tube 1. Hereinafter, the second electrode 3 is also referred to as "contact electrode 3".

The embodiment will be described on an assumption that the common potential Vcom is 0V (ground potential).

The clock signal generating portion 8 is a circuit that generates a clock signal for controlling an operation timing of each function portion. Specifically, the clock signal generating portion 8 divides a reference clock signal CLK0 output from the data processing controlling portion 6 described below to generate various clock signals CLK1, CLKp, and CLKn. Specific examples of the clock signals CLK1, CLKp, and CLKn will be described below.

The AC signal generation portion 4 is a circuit that generates an AC signal applied to the non-contact electrode 2. The AC signal generation portion 4 generates, for example, a pulse as the AC signal. As illustrated in FIG. 1, for example, the AC signal generation portion 4 can be realized by a switch SW3 having a first terminal P1 connected to the common potential Vcom, a second terminal P2 connected to reference potential Vref (>Vcom), and a third terminal P3 connected to a resistor R1.

The switch SW3 switches a connection destination of the third terminal P3 between the first terminal P1 and the second terminal P2 in response to the clock signal CLK1 with a specific period output from the clock signal generating portion 8. As a result, a pulse V1 in which a low level voltage is the common potential Vcom, a high level voltage is the reference potential Vref, and a frequency f1 is the same as the clock signal CLK1 is output from the third terminal P3.

One end of the resistor R1 is connected to an output terminal (above-mentioned third terminal of switch SW3) of the AC signal generation portion 4, and the other end is connected to the non-contact electrode 2. As a result, the pulse V1 output from the AC signal generation portion 4 is input to the non-contact electrode 2 through the resistor R1.

The voltage detecting portion 5 is a circuit that detects a voltage of a signal V2 generated in the non-contact electrode 2. Specifically, the voltage detecting portion 5 detects a voltage of the signal V2 during a period Tp in which the pulse V1 has a first polarity (for example, high level (=Vref)), and detects a voltage of the signal V2 during a period in which the pulse V1 has a second polarity (for example, low level (=Vcom)) opposite to the first polarity.

More specifically, the voltage detecting portion 5 comprises, for example, a buffer amplifier U1 and sample hold circuits 51 and 52. The buffer amplifier U1 is comprised of, for example, an operational amplifier or the like, and buffers and outputs the signal V2 generated in the non-contact electrode 2. A voltage of a signal V2$b$ output from the buffer amplifier U1 and the voltage of the signal V2 are substantially equal (V2$b$≈V2).

The sample hold circuits 51 and 52 are circuits for sampling and holding the voltage of the signal V2$b$ output from the buffer amplifier U1 at a predetermined timing.

The sample hold circuit 51 comprises, for example, a switch SW1 in which one end is connected to an output terminal of the buffer amplifier U1 and a capacitor C1 is connected between the other end of the switch SW1 and the common potential Vcom. For example, the switch SW1 is switched on/off in response to the clock signal CLKp. As a result, the sample hold circuit 51 can perform the sampling of the voltage of the signal V2$b$ in response to the clock signal CLKp.

The sample hold circuit 52 comprises, for example, a switch SW2 in which one end is connected to the output terminal of the buffer amplifier U1 and a capacitor C2 is connected between the other end of the switch SW2 and the common potential Vcom. For example, the switch SW2 is switched on/off in response to the clock signal CLKn. As a result, the sample hold circuit 52 can perform the sampling of the voltage of the signal V2$b$ in response to the clock signal CLKn.

Figure 2:
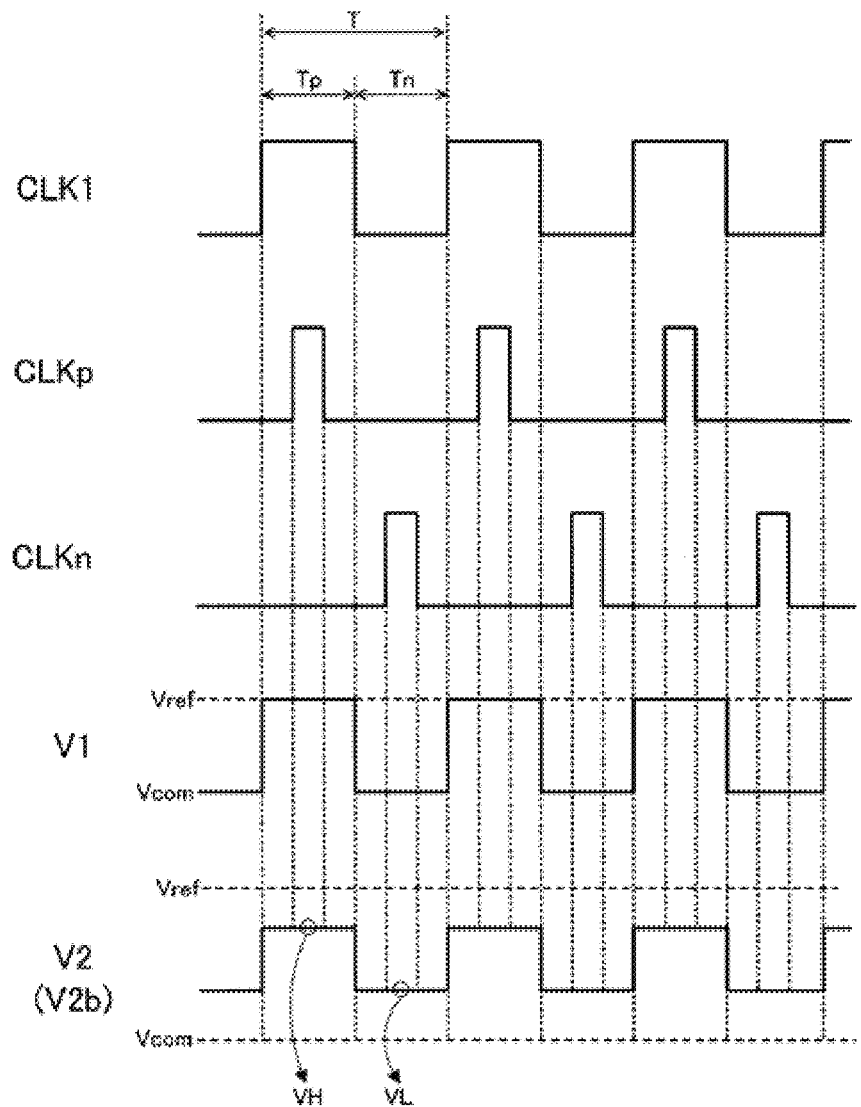
FIG. 2 is a timing chart diagram illustrating an operation timing of a voltage detecting portion.

FIG. 2 is a timing chart diagram illustrating an operation timing of a voltage detecting portion 5.

As illustrated in FIG. 2, the clock signal generating portion 8 generates a pulse with a period T (for example, duty ratio: 50%) as the clock signal CLK1, and provides the pulse to the AC signal generation portion 4. The AC signal generation portion 4 connects the third terminal P3 to the second terminal P2 (=Vref) when the clock signal CLK1 is at the high level, and connects the third terminal P3 to the first terminal P1 (=Vcom) when the clock signal CLK1 is at the low level. As a result, as illustrated in FIG. 2, the pulse V1, which becomes the reference potential Vref when the clock signal CLK1 is at the high level (first polarity) and becomes the common potential Vcom when the clock signal CLK1 is at the low level (second polarity), is output from the third terminal P3. The pulse V1 output from the third terminal P3 of the AC signal generation portion 4 is input to the non-contact electrode 2 through the resistor R1.

When the above-mentioned pulse V1 is output while the measurement target fluid flows inside of the measurement tube 1 and the contact electrode 3, a current flows into the common potential Vcom through the resistor R1, the non-contact electrode 2, the measurement target fluid, and the contact electrode 3. As a result, the signal V2 having a voltage according to the resistor R1 and an impedance on the other end side of the resistor R1 is generated in the non-contact electrode 2. At the time, as illustrated in FIG. 2, the signal V2 becomes a signal in which the voltage varies in synchronization with the pulse V1.

The clock signal generating portion 8 supplies a pulse which becomes the high level during the period Tp—in which the clock signal CLK1 is at the high level, that is, during the period in which the pulse V1 has the first polarity (for example, high level (=Vref))—to the sample hold circuit 51 as the clock signal CLKp.

The switch SW1 of the sample hold circuit 51 is turned on when the clock signal CLKp is at the high level, and turned off when the clock signal CLKp is at the low level. As a result, the sample hold circuit 51 samples a voltage VH when the signal V2 (V2$b$) generated in the non-contact electrode 2 becomes the high level.

Further, the clock signal generating portion 8 supplies a pulse which becomes the high level during the period Tn—in which the clock signal CLK1 is at the low level, that is, during the period when the pulse V1 has the second polarity (for example, low level (=Vcom))—to the sample hold circuit 52 as the clock signal CLKn.

The switch SW2 of the sample hold circuit 52 is turned on when the clock signal CLKn is at the high level, and turned off when the clock signal CLKn is at the low level. As a result, the sample hold circuit 52 samples a voltage VL when the signal V2 (V2$b$) generated in the non-contact electrode 2 becomes the low level.

The analog/digital converting portion 7 is a circuit that converts a voltage difference between the voltage VH obtained by the sample hold circuit 51 and the voltage VL sampled and held by the sample hold circuit 52 into a digital signal.

The data processing controlling portion 6 is a function portion that performs an overall control of each function portion configuring the electrical conductivity meter 100. The data processing controlling portion 6 is comprised of a program processing device, such as a microcontroller and a CPU.

Specifically, the data processing controlling portion 6 comprises a reference clock generating portion 61 and an electrical conductivity calculating portion 62.

The reference clock generating portion 61 is a function portion that generates a reference clock signal CLK0 supplied to the clock signal generating portion 8. The reference clock generating portion 61 can be realized by, for example, an oscillation circuit or the like that generates a signal using externally attached quartz crystal or ceramic oscillator.

The electrical conductivity calculating portion 62 is a function portion that calculates the electrical conductivity of the measurement target fluid based on an amplitude of voltages detected by the voltage detecting portion 5. The electrical conductivity calculating portion 62 is realized by program processing of the program processing device, such as the microcontroller and the CPU, described above. A specific calculation method of the electrical conductivity by the electrical conductivity calculating portion 62 will be described below.

The setting/displaying portion 9 has a function of detecting a setting operation input by an operator and outputting the detected input to the data processing controlling portion 6, and a function of displaying a display output from the data processing controlling portion 6 using, for example, an LED or an LCD.

The analog outputting portion 10 is a function portion for outputting information such as a calculation result by the electrical conductivity calculating portion 62 to an external apparatus. Specifically, the analog outputting portion 10 outputs the calculation result by the electrical conductivity calculating portion 62 as an analog signal of 4 to 20 mA.

<Calculation Principle of Electrical Conductivity>

Next, a calculation principle of the electrical conductivity in the electrical conductivity meter 100 of the embodiment will be described.

As described above, in the state where the measurement target fluid flows through the inside of the measurement tube 1 and the contact electrode 3, when the pulse V1 is input to one end of the resistor R1, the current flows into the common potential Vcom through the resistor R1, the non-contact electrode 2, the measurement target fluid, and the contact electrode 3. A current path of the current can be represented by an equivalent circuit 200 illustrated in FIG. 3A.

Specifically, the equivalent circuit 200 is comprised of resistors R1 and Rb, capacitors Ca and Cb, and a signal source V1 that outputs the pulse V1. Here, Rb indicates a resistance value of the measurement target fluid, Ca indicates polarization capacitance between the contact electrode 3 and the measurement target fluid, and Cb indicates capacitance between the measurement target fluid and the non-contact electrode 2.

A value of the capacitor Cb between the measurement target fluid and the non-contact electrode 2 becomes small as compared with the two-electrode type electrical conductivity meter in the related art in which the two electrodes are in contact with the measurement target fluid at the same time. For this reason, in order to measure a value of the resistor Rb of the measurement target fluid with high accuracy and with good reproducibility, it is desirable to make the frequency f1 of the pulse V1 as high as possible to minimize a reactance component due to the capacitor Cb with respect to the resistor Rb in the equivalent circuit 200.

Figure 3A:
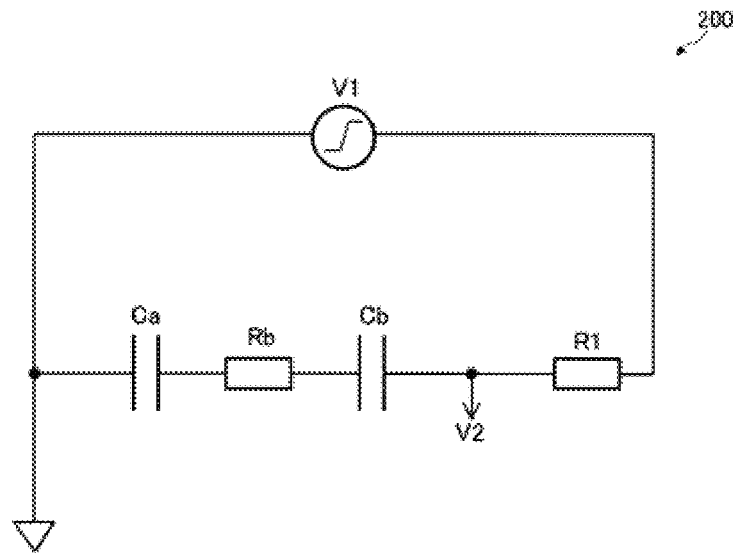
FIG. 3A is a diagram illustrating an equivalent circuit of a current path from a signal source V1 to common potential Vcom through a non-contact electrode 2 in an electrical conductivity meter 100.
Figure 3B:
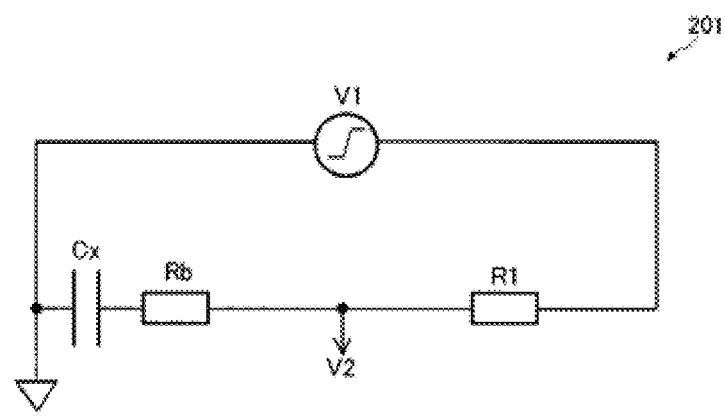
FIG. 3B is a diagram illustrating a simpler equivalent circuit of the current path from the signal source V1 to the common potential Vcom through the non-contact electrode 2 in the electrical conductivity meter 100.

In a case where the frequency f1 of the pulse V1 is increased to a level at which impedances of the capacitors Ca and Cb can be negligible, the equivalent circuit 200 can be redrawn in an equivalent circuit 201 illustrated in FIG. 3B. That is, the equivalent circuit 201 with the current path from the signal source V1 to the common potential Vcom through the non-contact electrode 2 can be represented by a signal V1 having an amplitude of ±Vref/2 with reference to a voltage Vref/2, a resistor voltage dividing circuit formed of a resistor R1 and a resistor Rb, and a coupling capacitor Cx.

In the equivalent circuit 201, a ratio of a voltage drop of the resistor R1 to a voltage drop of the resistor Rb during the period Tp in which the voltage of the signal V2 is at the high level is expressed by the following Equation (1). Here, Vr1_H represents a voltage across the resistor R1 during the period Tp in which the voltage of the signal V2 is at the high level, and Vrb_H represents a voltage across the resistor Rb during the period Tp in which the voltage of the signal V2 is at the high level.

[Math 1]

$$\text{Vr1\_H} : \text{Vrb\_H} \approx \left\{ \frac{Vref}{2} - \left(VH - \frac{Vref}{2}\right) \right\} : \left(VH - \frac{Vref}{2}\right) = (Vref - VH) : \left(VH - \frac{Vref}{2}\right) \quad (1)$$

In the equivalent circuit 201, a ratio of a voltage drop of the resistor R1 to a voltage drop of the resistor Rb during the period Tn in which the voltage of the signal V2 is at the low level is expressed by the following Equation (2). Here, Vr1_L represents a voltage across the resistor R1 during the period Tn in which the voltage of the signal V2 is at the low level, and Vrb_L represents a voltage across the resistor Rb during the period Tn in which the voltage of the signal V2 is at the low level. As described above, VH is a voltage when the signal V2b (V2) is at the high level, and VL is a voltage when the signal V2b (V2) is at the low level (refer to FIG. 2).

[Math 2]

$$\text{Vr1\_L} : \text{Vrb\_L} \approx VL : \left(\frac{Vref}{2} - VL\right) \quad (2)$$

From the above Equations (1) and (2), a ratio between a voltage Vr1_HL, which is a sum of a voltage Vr1_H and a voltage Vr1_L, and a voltage Vrb_HL, which is a sum of a voltage Vrb_H and a voltage Vrb_L, is expressed by the following Equation (3).

[Math 3]

$$\text{Vr1\_HL} : \text{Vrb\_HL} \approx \{Vref - (VH - VL)\} : (VH - VL) \quad (3)$$

From Equation (3), a ratio between the resistor R1 and the resistor Rb is expressed by the following Equation (4).

[Math 4]

$$R1 : Rb \approx \{Vref - (VH - VL)\} : (VH - VL) \quad (4)$$

From the above Equation (4), the resistor Rb is expressed by the following Equation (5).

[Math 5]

$$Rb = \frac{R1 \times (VH - VL)}{Vref - (VH - VL)} \quad (5)$$

In the above Equation (5), both the reference potential Vref and the resistor R1 are known values. Accordingly, when a difference (VH−VL) between the voltage VH when the signal V2b (V2) is at the high level and the voltage VL when the signal V2b (V2) is at the low level, that is, an amplitude of the signal V2b (V2) is known, it is possible to obtain the resistor Rb of the measurement target fluid, that is, the electrical conductivity (=1/Rb) of the measurement target fluid based on Equation (5).

Figure 4:
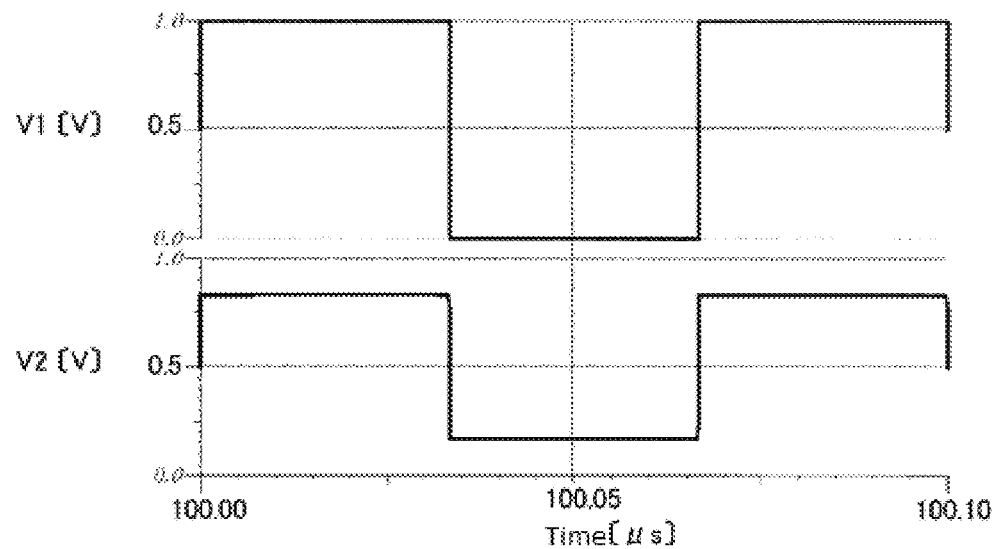
FIG. 4 is a diagram illustrating a simulation result of a signal V2 in the equivalent circuit 200 illustrated in FIG. 3A.

FIG. 4 is a diagram illustrating a simulation result of the signal V2 in the equivalent circuit 200 illustrated in FIG. 3A.

In the figure, in the equivalent circuit 200, the simulation result of the signal V2 is illustrated when R1=10 [kΩ], Rb=20 [kΩ], Ca=0.1 [µF], Cb=100 [pF], and a frequency and an amplitude of the pulse V1 are 15 [MHz] and 1 [V], respectively.

In the simulation result illustrated in FIG. 4, the voltage VH when the signal V2 is at the high level is about 0.8333V, and the voltage VL when the signal V2 is at the low level is about 0.1667V. Accordingly, in the case, the resistor Rb of the measurement target fluid is about 19.99 [Ω] from Equation (5).

In the electrical conductivity meter 100 according to the embodiment, the electrical conductivity calculating portion 62 calculates the electrical conductivity of the measurement target fluid flowing through the measurement tube 1 by substituting the values of the voltages VH and VL input through the analog/digital converting portion 7 into Equation (5) described above.

As described above, in order to measure the value of the resistor Rb of the measurement target fluid with high accuracy and with good reproducibility, it is desirable to make the frequency f1 of the pulse V1 as high as possible to minimize the reactance component due to the capacitor Cb with respect to the resistor Rb. However, when the frequency f1 is set to be too high, the measurement accuracy of the resistor Rb of the measurement target fluid may decrease. Therefore, in a case of attempting to further improve the measurement accuracy and the reproducibility of the resistor Rb of the measurement target fluid, it is necessary to set the frequency f1 of the pulse V1 to an appropriate value. Hereinafter, description will be made in detail.

Figure 5:
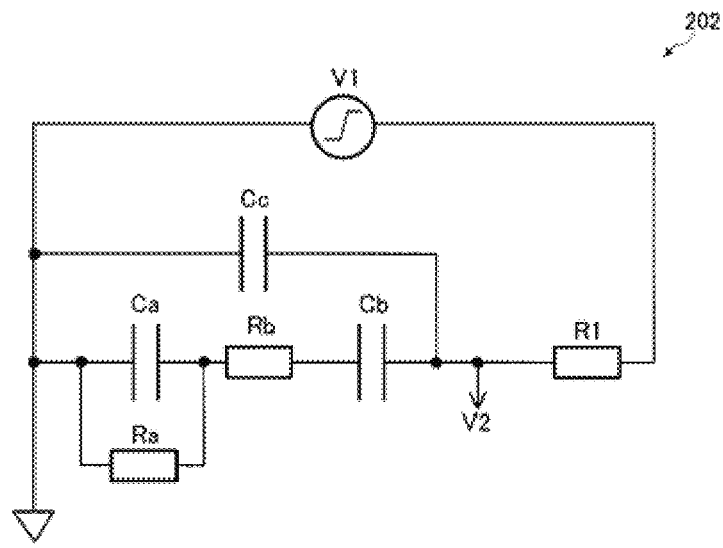
FIG. 5 is a diagram illustrating another equivalent circuit of the current path from the signal source V1 to the common potential Vcom through the non-contact electrode 2 in the electrical conductivity meter 100.

FIG. 5 is a diagram illustrating another equivalent circuit of the current path from the signal source V1 to the common potential Vcom through the non-contact electrode 2 in the electrical conductivity meter 100.

As illustrated in an equivalent circuit 202 of the figure, a capacitor Cc between the contact electrode 3 and the non-contact electrode 2, and a polarization resistance Ra between the contact electrode 3 and the measurement target fluid actually exist in addition to the resistors R1 and Rb and the capacitors Ca and Cb between the signal source V1 generating the pulse V1 and the common potential Vcom. Here, Ca>>Cb>>Cc and Ra>>Rb.

When the frequency f1 of the pulse V1 is set to be too high, it is necessary to regard the current path between the signal source V1 and the common potential Vcom as the equivalent circuit 202 instead of the simple equivalent circuit 201 illustrated in FIG. 3B. For the reason, a waveform of a voltage applied to the resistor Rb is distorted due to the influence of the capacitor Cc, and the measurement accuracy of the resistor Rb may decrease.

Therefore, in order to suppress the decrease in the measurement accuracy of the resistor Rb due to the capacitor Cc, it is necessary to consider the influence of the impedance due to the capacitor Cb. Specifically, a reactance component Zcb (=1/(2πf1×Cb)) due to the capacitor Cb needs to satisfy a condition expressed by the following Equation (6).

[Math 6]

$$\frac{Rb}{10} \le Zcb \le Rb \quad (6)$$

When Equation (6) is rewritten to an equation of the frequency f1, Equation (7) is obtained.

[Math 7]

$$\frac{1}{2 \times \pi \times Cb \times Rb} \le f1 \le \frac{10}{2 \times \pi \times Cb \times Rb} \quad (7)$$

Accordingly, it is possible to suppress the decrease in the measurement accuracy of the fluid resistor (liquid resistor) Rb, that is, the electrical conductivity by setting the frequency f1 of the pulse V1 to a value within a range expressed by Equation (7).

Here, since the capacitor Cb is determined by a relative permittivity of an electrical insulating material configuring mainly an area of the non-contact electrode 2 and the measurement tube 1 and the influence of the polarization capacitance is so small as to be negligible, it is possible to grasp the value of the capacitor Cb in advance.

For example, in Equation (7), when Rb=10 [kΩ] and Cb=100 [pF], the frequency f1 of the pulse V1 is in a range of about 160 kHz to 1600 kHz.

Figure 6A:
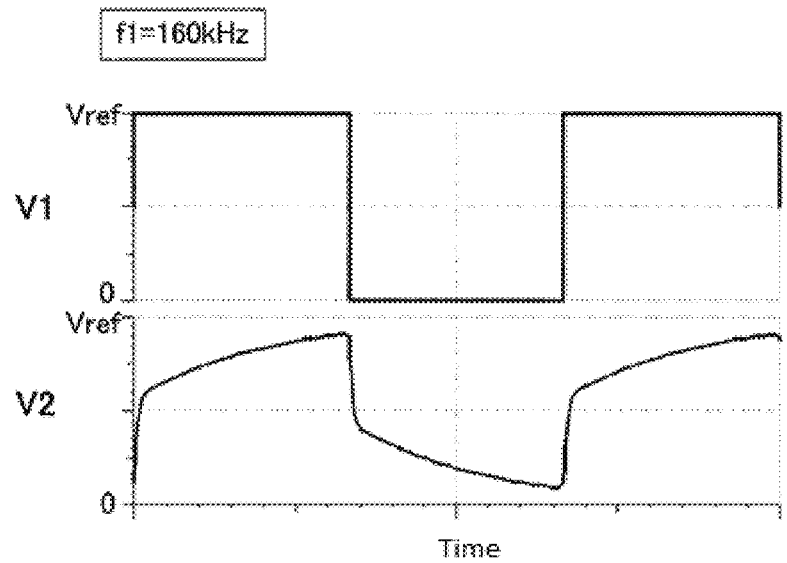
FIG. 6A is a diagram illustrating a simulation waveform of a signal V2 in a case where a frequency f1 of a pulse V1 is 160 kHz in the equivalent circuit 202 illustrated in FIG. 5.
Figure 6B:
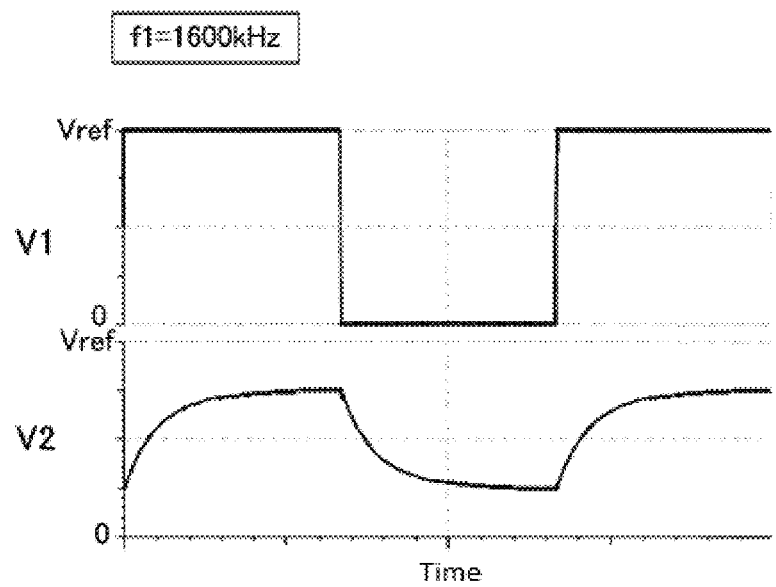
FIG. 6B is a diagram illustrating a simulation waveform of the signal V2 in a case where the frequency f1 of the pulse V1 is 1600 kHz in the equivalent circuit 202 illustrated in FIG. 5.

FIGS. 6A and 6B illustrate simulation results when the frequency f1 of the pulse V1 is set to a value in the range of 160 kHz to 1600 kHz. FIG. 6A is a diagram illustrating a simulation waveform of the signal V2 in a case where the frequency f1 of the pulse V1 is 160 kHz in the equivalent circuit 202, and FIG. 6B is a diagram illustrating a simulation waveform of the signal V2 in a case where the frequency f1 of the pulse V1 is 1600 kHz in the equivalent circuit 202. In the simulation, Ra=1 [MΩ], Rb=10 [kΩ], Ca=0.1 [uF], Cb=100 [pF], and Cc=10 [pF].

As described above, in the case of attempting to improve the measurement accuracy and the reproducibility of the resistor Rb of the measurement target fluid, the frequency f1 of the pulse V1 may be set to an appropriate range (Equation (7)) considering the equivalent circuit 202.

However, even in the case where the frequency f1 of the pulse V1 may be set to the appropriate range, since the current path between the signal source V1 and the common potential Vcom cannot be completely regarded as the simple equivalent circuit 201 illustrated in FIG. 3B, some error may occur in a calculation method based on Equation (5).

Figure 7:
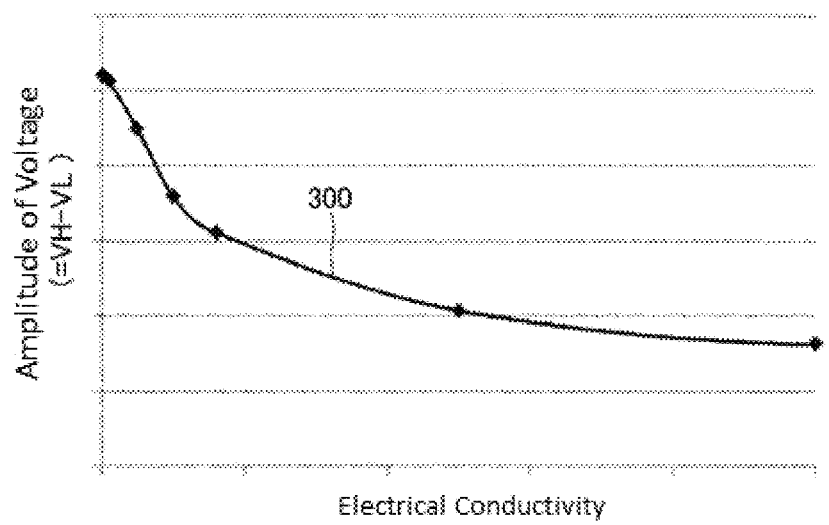
FIG. 7 is a diagram illustrating a relationship between an amplitude (VH–VL) of the signal V2 and an electrical conductivity of a measurement target fluid.

For example, in the equivalent circuit 202 illustrated in FIG. 5, a relationship between the amplitude (VH−VL) of the signal V2 and the electrical conductivity of the measurement target fluid is represented by, for example, a non-linear characteristic 300 illustrated in FIG. 7.

Figure 8:
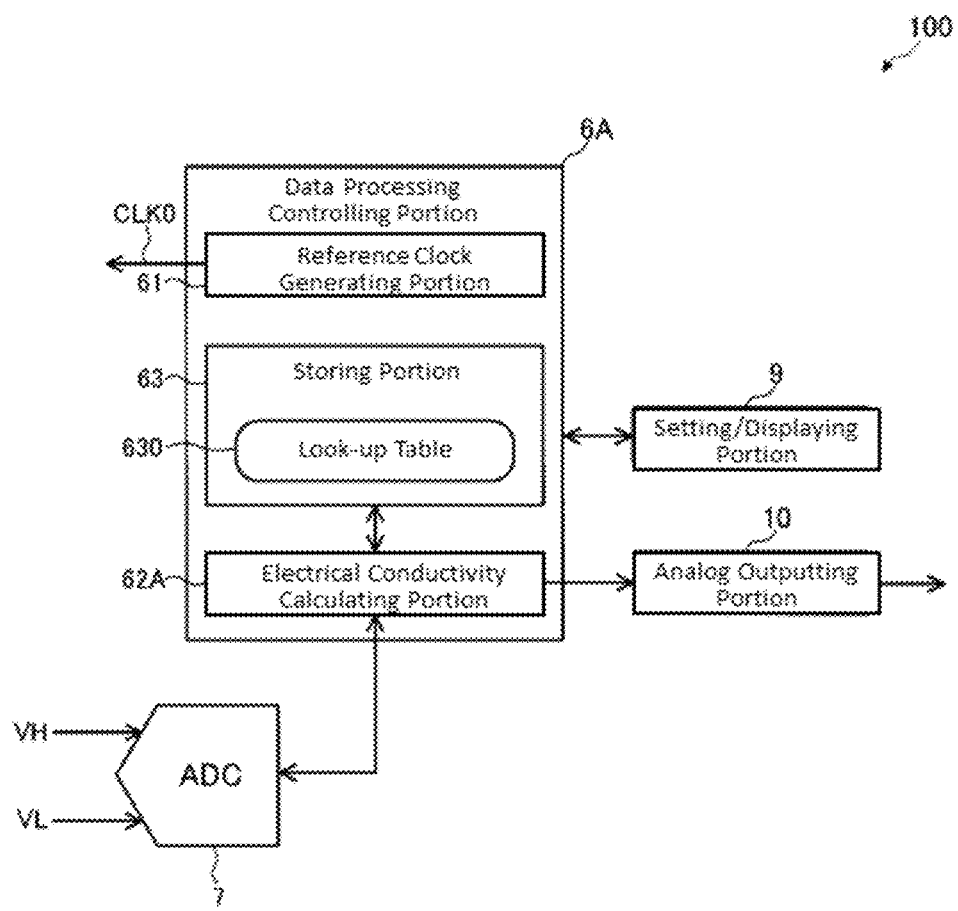
FIG. 8 is a diagram illustrating another configuration example of a data processing controlling portion 6A.

Therefore, in the case of attempting to further improve the measurement accuracy and the reproducibility of the resistor Rb of the measurement target fluid, as illustrated in FIG. 8, the electrical conductivity may be calculated using a look-up table created in advance indicating a correspondence relationship between the amplitude (VH−VL) of the signal V2 and the electrical conductivity of the measurement target fluid. FIG. 8 illustrates only peripheral function portions of a data processing controlling portion 6A, and other function portions are omitted.

For example, a test is performed in advance to examine the relationship between the amplitude (VH−VL) of the signal V2 and the electrical conductivity of the measurement target fluid using a fluid (liquid) in which the electrical conductivity is known, and a look-up table 630 indicating the correspondence relationship between the amplitude (VH−VL) of the signal V2 and the electrical conductivity of the measurement target fluid is created based on the test result. As illustrated in FIG. 8, the created look-up table 630 is stored in, for example, a storing portion 63, such as a non-volatile memory, in the program processing device, such as a microcontroller, functioning as the data processing controlling portion 6A.

When the electrical conductivity of the measurement target fluid is calculated, the electrical conductivity calculating portion 62A refers to the look-up table 630 stored in the storing portion 63 and reads a value of the electrical conductivity corresponding to the value of the amplitude (VH−VL) calculated from the values of the voltages VH and VL input through the analog/digital converting portion 7 to calculate the electrical conductivity of the measurement target fluid.

According to this, it is possible to further improve the measurement accuracy and the reproducibility of the resistor Rb of the measurement target fluid.

Next, a realization example of the electrical conductivity meter 100 is illustrated.

Figure 9:
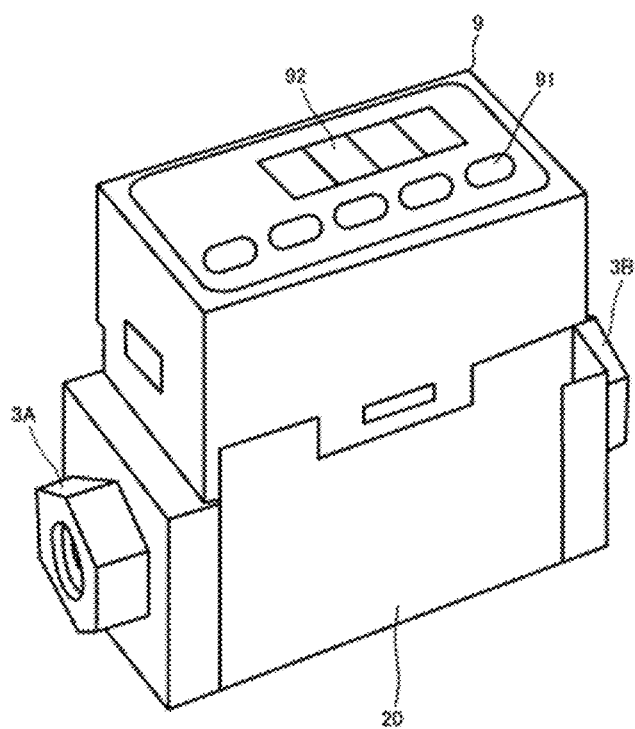
FIG. 9 is a perspective view illustrating a realization example of the electrical conductivity meter 100 according to an embodiment.

FIG. 9 is a perspective view illustrating the realization example of the electrical conductivity meter 100 according to the embodiment.

As illustrated in the figure, the electrical conductivity meter 100 is realized by accommodating the measurement tube 1, the non-contact electrode 2, and the contact electrode 3, and a printed circuit board on which electronic circuits and the like, such as the AC signal generation portion 4, the voltage detecting portion 5, the data processing controlling portion 6, the analog/digital converting portion 7, the clock signal generating portion 8, and the analog outputting portion 10, are formed in a casing 20 formed of a metal, a resin, or the like, and by covering an opening portion of the casing 20 with the setting/displaying portion 9.

The setting/displaying portion 9 comprises an operating button 91 for realizing the function of detecting the setting operation input by the operator and outputting the detected input to the data processing controlling portion 6, and a display device 92, such as the LED or the LCD, for realizing the function of displaying the display output from the data processing controlling portion 6.

In a pair of facing side surfaces of the casing 20, pipe-shaped joints 3A and 3B comprised of a metal material (for example, SUS) capable of connecting a pipe (not illustrated) provided outside the electrical conductivity meter 100 and the measurement tube 1 are disposed.

Figure 10:
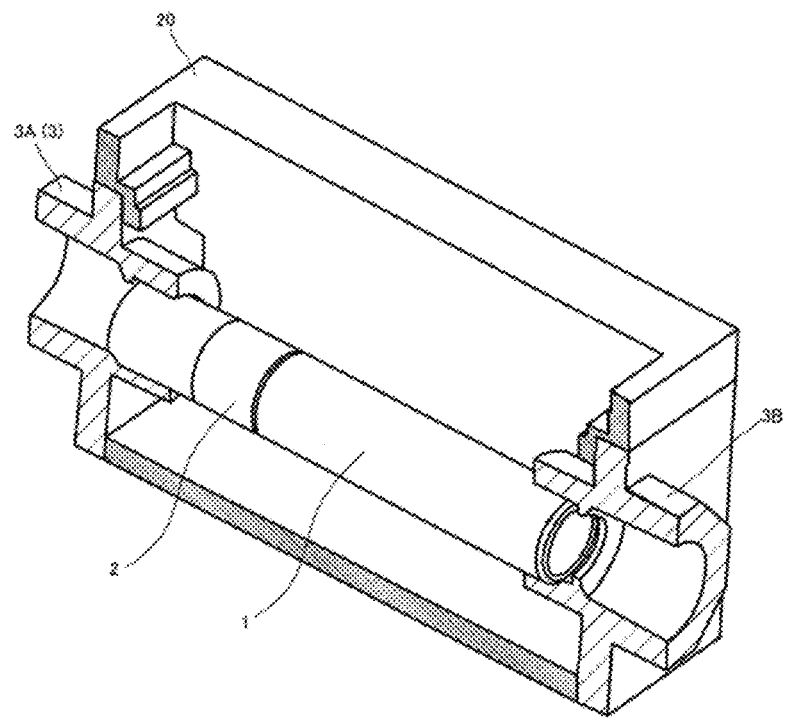
FIG. 10A is a cross-sectional perspective view illustrating the inside of a casing 20.
FIG. 10B is a cross-sectional front view illustrating the inside of the casing 20.
Figure 10:
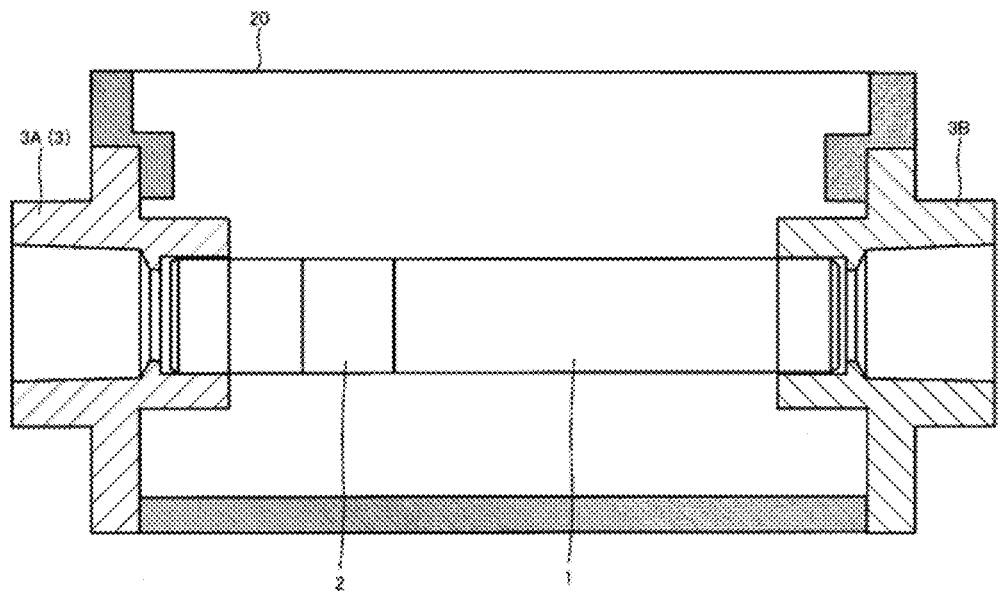

FIG. 10A is a cross-sectional perspective view illustrating the inside of the casing 20, and FIG. 10B is a cross-sectional front view illustrating the inside of the casing 20.

As illustrated in FIGS. 10A and 10B, the measurement tube 1 is disposed in the casing 20 along the longitudinal direction of the casing 20. The joint 3A and the joint 3B are connected respectively to both end portions of the measurement tube 1.

Here, one of two joints 3A and 3B functions as the contact electrode 3. For example, as illustrated in FIGS. 10A and 10B, the joint 3A not only connects an external pipe to the measurement tube 1, but also functions as the contact electrode 3 by being connected to the common potential Vcom. In this case, the non-contact electrode 2 is formed on an outer peripheral surface near the end portion to which the joint 3A is connected in the measurement tube 1.

As described above, an area of the contact electrode 3 in contact with the measurement target fluid is widened by realizing the contact electrode 3 with the joint 3A formed of the metal. As a result, even in the case where the adhesion of the foreign matter or the corrosion occurs in the contact electrode 3, since the area of a portion in which the adhesion of the foreign matter or the corrosion occurs is relatively small with respect to the entire area of the contact electrode 3, it is possible to suppress the measurement error due to the change in the polarization capacitance.

Figure 11A:
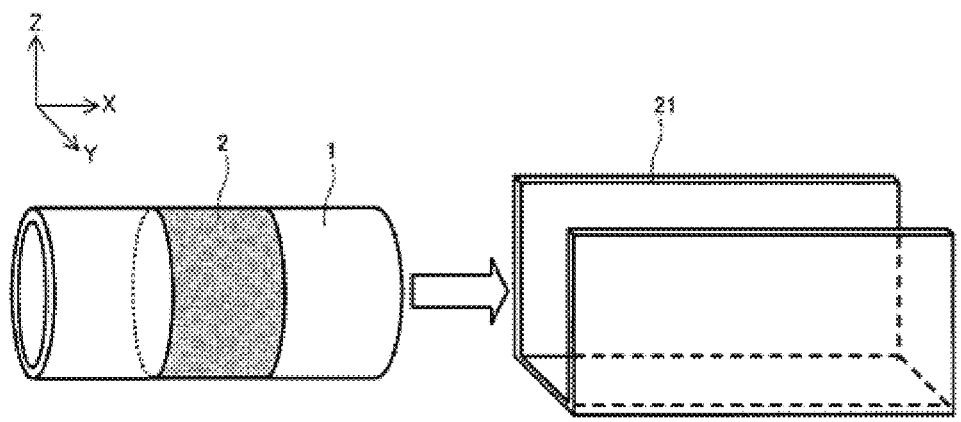
FIG. 11A is a perspective view illustrating a disposition example of a shield cover.

On the other hand, it is desirable that the non-contact electrode 2 is surrounded by, for example, a shield cover 21 formed of a metal connected to the common potential Vcom. For example, as illustrated in FIG. 11A, the measurement tube 1 is disposed such that the non-contact electrode 2 is surrounded by the shield cover 21 in the casing 20. According to this, it is possible to reduce an electromagnetic wave noise radiated from the non-contact electrode 2 to the outside of the casing 20.

Figure 11B:
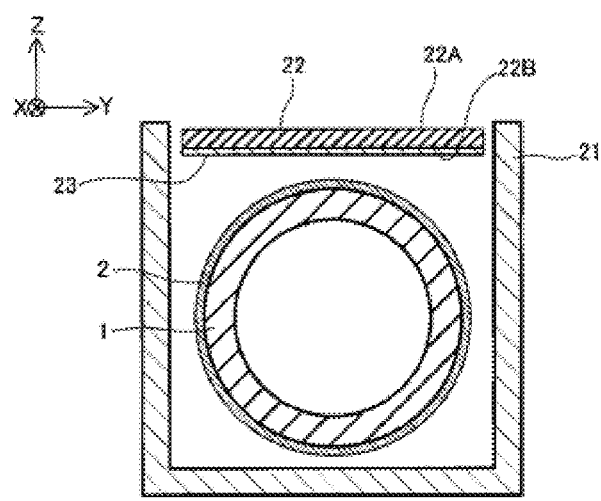
FIG. 11B is a side view illustrating the disposition example of a shield cover.

Here, the shield cover 21 may be disposed to face at least a part of the non-contact electrode 2. For example, as illustrated in FIG. 11B, the shield cover 21 may be formed in a U shape in a side view, and a printed circuit board 22 on which the electronic circuits and the like configuring the AC signal generation portion 4, the data processing controlling portion 6, and the like described above are formed on a principal surface 22A may be disposed on an opening side of the shield cover 21. In the case, a metal solid pattern 23 is formed entirely on a main surface 22B opposite to the principal surface 22A of the printed circuit board 22.

According to this, since it is easy to route signal lines connecting the AC signal generation portion 4 and the voltage detecting portion 5 disposed on the printed circuit board 22 with the non-contact electrode 2, and most of the signal lines can be disposed in the shield cover 21, it is possible to reduce the electromagnetic wave noise radiated from the signal lines to the outside of the casing 20.

<<Effect of Electrical Conductivity Meter 100>>

With the electrical conductivity meter 100 according to the embodiment, it is possible to calculate the electrical conductivity of the measurement target fluid flowing through the measurement tube 1 by providing the contact electrode 3 in contact with the measurement target fluid, and the non-contact electrode 2 provided on the outer peripheral surface of the measurement tube 1 and not in contact with the measurement target fluid, by applying the AC signal to the non-contact electrode 2 through the resistor R1 in the state of connecting the contact electrode 3 to the common potential Vcom, and by detecting the amplitude (VH−VL) of the signal V2 generated in the non-contact electrode 2 at the time.

According to this, since one electrode is not in contact with the measurement target fluid, it is possible to suppress the measurement error due to the adhesion of the foreign matter or the corrosion of the electrode as compared with the two-electrode type electrical conductivity meter in the related art in which the two electrodes are in contact with the measurement target fluid at the same time.

Since it is not necessary to use the expensive platinum black at least for the non-contact electrode 2, it is possible to suppress the manufacturing cost of the electrical conductivity meter.

Accordingly, with the electrical conductivity meter according to the embodiment, it is possible to realize a highly accurate two-electrode type electrical conductivity meter at a lower cost.

As described above, it is possible to further improve the measurement accuracy and the reproducibility of the electrical conductivity of the measurement target fluid (resistor Rb) by setting the frequency f1 of the pulse V1 applied to the non-contact electrode 2 through the resistor R1 to the value within the range expressed by Equation (7).

In the electrical conductivity meter 100, it is possible to further improve the measurement accuracy and the reproducibility of the electrical conductivity of the measurement target fluid by storing the look-up table 630 indicating the correspondence relationship between the amplitude (VH−VL) of the signal V2 and the electrical conductivity of the measurement target fluid in the storing portion 63, and by reading the electrical conductivity corresponding to the value of the amplitude of the voltages detected by the voltage detecting portion 5 using the look-up table 630.

In the electrical conductivity meter 100, since the voltage VH of the signal V2 generated in the non-contact electrode 2 when the pulse V1 is at the high level, and the voltage VL of the signal V2 generated in the non-contact electrode 2 when the pulse V1 is at the low level are detected using the two sample hold circuits 51 and 52, it is easy to acquire the amplitude of the signal V2 generated in the non-contact electrode 2.

According to the electrical conductivity meter 100, since a voltage/current conversion circuit for converting a voltage of the signal V2 into a current is unnecessary, it is possible to measure the electrical conductivity with a simpler circuit configuration.

With the electrical conductivity meter 100 according to the embodiment, it is possible to suppress the decrease in measurement stability of the electrical conductivity. For example, in an electrical conductivity meter of a type for full-wave rectifying an AC signal in a related art, that is, the electrical conductivity meter of the type for folding a voltage in a low level (negative polarity) period of the AC signal at an intermediate level, and adding the folded voltage to a voltage in a high level (positive polarity) period of the AC signal, in a case where a waveform in the high level period of the AC signal is not equal to a waveform in the low level period, the measurement stability deteriorates since a complete DC voltage is not obtained due to a remaining pulsating flow even when the full-wave rectification is performed. On the contrary, since the electrical conductivity meter 100 according to the embodiment has the configuration of obtaining the amplitude (VH–VL) of the signal V2 by performing the analog/digital conversion of the AC signal (signal V2) in the state of a differential signal, even in a case where a fluctuation occurs in a signal waveform due to a change in a flow velocity of the measurement target fluid or in a case where a common noise intrudes from the outside through the measurement target fluid, the measurement stability of the electrical conductivity is difficult to decrease.

It is possible to widen the area in contact with the measurement target fluid of the contact electrode 3 by using the joint 3A formed of a metal for connecting to the external pipe as the contact electrode 3. According to this, as described above, even in the case where the adhesion of the foreign matter or the corrosion occurs in the contact electrode 3, since the area of the portion in which the adhesion of the foreign matter or the corrosion occurs is relatively small with respect to the entire contact area of the contact electrode 3, it is possible to further reduce the measurement error due to the adhesion of the foreign matter or the corrosion of the electrode.

In the case of connecting the metal pipe to the joint 3A, since the metal pipe is connected to the common potential Vcom through the joint 3A, it is possible to regard not only the joint 3A, but also the metal pipe as the contact electrode 3. According to this, since the contact area of the contact electrode 3 further increases and the area of the portion in which the adhesion of the foreign matter or the corrosion occurs is relatively small with respect to the entire contact area of the contact electrode 3, it is possible to further reduce the measurement error due to the adhesion of the foreign matter or the corrosion of the electrode.

Even in the case where the metal pipe is used, since the joint 3A as the contact electrode 3 and the metal pipe are at the same potential (common potential Vcom=0V), the measurement error due to the current flowing into the metal pipe does not occur.

Since the contact electrode 3 is connected to the common potential Vcom (=0V), even in the case where the metal pipe is used, it is possible to prevent the metal pipe as an antenna from radiating the electromagnetic wave noise around the periphery.

As illustrated in FIGS. 11A and 11B, it is possible to reduce the electromagnetic wave noise radiated from the non-contact electrode 2 to the outside of the casing 20 as described above by disposing the shield cover 21 formed of a metal to face at least a part of the non-contact electrode 2.

<<Extension of Embodiment>>

The invention made by the present inventor is described in detail based on the embodiment. However, it goes without saying that the present invention is not limited thereto and various modifications can be made without departing from the gist thereof.

For example, in the above embodiment, the configuration illustrated in FIG. 9 is exemplified as the realization example of the electrical conductivity meter 100, but the invention is not limited thereto.

In the above embodiment, the invention is not limited to the circuit configuration example illustrated in FIG. 1 as long as the AC signal generation portion 4 and the voltage detecting portion 5 can exhibit the functions.

Similar to the data processing controlling portion 6, the analog/digital converting portion 7 and the clock signal generating portion 8 may be realized by the function of the program processing device, such as the microcontroller.

An example in which the analog/digital converting portion 7 converts the voltage difference between the voltage VH obtained by the sample hold circuit 51 and the voltage VL sampled and held by the sample hold circuit 52 into the digital signal is described above, but VH and VL may also be converted respectively into digital signals and then a data processing controlling portion 6 may perform subtraction processing.

DESCRIPTION OF REFERENCE NUMERALS AND SIGNS

100: electrical conductivity meter; 1: measurement tube; 2: non-contact electrode (first electrode); 3: contact electrode (second electrode); 3A, 3B: joint; 4: AC signal generation portion; 5: voltage detecting portion; 6 and 6A: data processing controlling portion; 7: analog/digital converting portion; 8: clock signal generating portion; 9: setting/displaying portion; 10: analog outputting portion; 20: casing; 21: shield cover; 22: printed circuit board; 23: metal solid pattern; 51 and 52: sample hold circuit; 61: reference clock generating portion; 62: electrical conductivity calculating portion; 63: storing portion; 630: look-up table; 200, 201, and 202: equivalent circuit; 91: operating button; 92: display device; SW1, SW2, and SW3: switch; U1: buffer amplifier; CLK0: reference clock signal; CLK1, CLKp, and CLKn: clock signal; V1: pulse (signal source); V2, V2$b$: signal; Vcom: common potential; VH and VL: voltage of signal V2; Tp: period in which pulse V1 has first polarity; Tn: period in which pulse V1 has second polarity; Ra: polarization resistance; Rb: fluid resistance; R1: resistor; C1, C2, Cb, and Cc: capacitor; Ca: polarization capacitance.

The invention claimed is:

1. An electrical conductivity meter comprising:
   a measurement tube which is formed of an electrical insulation material and is configured to allow a measurement target fluid to flow through;
   a first electrode formed on an outer peripheral surface of the measurement tube and configured not to contact the measurement target fluid flowing through the measurement tube;
   a second electrode connected to a common potential and configured to come into contact with the measurement target fluid flowing through the measurement tube;
   a resistor of which one end is connected to the first electrode;

a voltage detecting portion that detects voltages of a signal generated in the first electrode due to an input of an alternating-current (AC) signal to another end of the resistor; and an electrical conductivity calculating portion that calculates an electrical conductivity of the measurement target fluid based on an amplitude of the voltages detected by the voltage detecting portion.

2. The electrical conductivity meter according to claim 1, wherein a frequency f1 of the AC signal input to the resistor satisfies a condition expressed by Equation (A) when a resistance value of the measurement target fluid is Rb, and a capacitance between the measurement target fluid flowing in the measurement tube and the first electrode is Cb

[Math 1]

$$\frac{1}{2 \times \pi \times Cb \times Rb} \leq f1 \leq \frac{10}{2 \times \pi \times Cb \times Rb}. \quad (A)$$

3. The electrical conductivity meter according to claim 2, wherein the voltage detecting portion comprises:
a first sample hold circuit for sampling and holding a first voltage of a signal generated in the first electrode in a first period in which the AC signal has a first polarity; and
a second sample hold circuit for sampling and holding a second voltage of the signal generated in the first electrode in a second period in which the AC signal has a second polarity opposite to the first polarity, and
wherein the electrical conductivity calculating portion calculates the electrical conductivity of the measurement target fluid based on the first voltage sampled by the first sample hold circuit and the second voltage sampled by the second sample hold circuit.

4. The electrical conductivity meter according to claim 3, further comprising:
a storing portion that stores a look-up table indicating a correspondence relationship between an amplitude of voltages detected by the voltage detecting portion and the electrical conductivity of the measurement target fluid,
wherein the electrical conductivity calculating portion reads the electrical conductivity of the measurement target fluid corresponding to a value of the amplitude of the voltages detected by the voltage detecting portion from the look-up table stored in the storing portion.

5. The electrical conductivity meter according to claim 4, wherein the second electrode is a pipe-shaped joint formed of a metal, of which one end is connected to the measurement tube and another end is connectable to an external pipe.

6. The electrical conductivity meter according to claim 5, further comprising:
a shield cover formed of a metal and disposed to face at least a part of the first electrode.

7. The electrical conductivity meter according to claim 4, further comprising:
a shield cover formed of a metal and disposed to face at least a part of the first electrode.

8. The electrical conductivity meter according to claim 3, wherein the second electrode is a pipe-shaped joint formed of a metal, of which one end is connected to the measurement tube and another end is connectable to an external pipe.

9. The electrical conductivity meter according to claim 3, further comprising:
a shield cover formed of a metal and disposed to face at least a part of the first electrode.

10. The electrical conductivity meter according to claim 2, further comprising:
a storing portion that stores a look-up table indicating a correspondence relationship between an amplitude of voltages detected by the voltage detecting portion and the electrical conductivity of the measurement target fluid,
wherein the electrical conductivity calculating portion reads the electrical conductivity of the measurement target fluid corresponding to a value of the amplitude of the voltages detected by the voltage detecting portion from the look-up table stored in the storing portion.

11. The electrical conductivity meter according to claim 2, wherein the second electrode is a pipe-shaped joint formed of a metal, of which one end is connected to the measurement tube and another end is connectable to an external pipe.

12. The electrical conductivity meter according to claim 2, further comprising:
a shield cover formed of a metal and disposed to face at least a part of the first electrode.

13. The electrical conductivity meter according to claim 1, wherein the voltage detecting portion comprises:
a first sample hold circuit for sampling and holding a first voltage of a signal generated in the first electrode in a first period in which the AC signal has a first polarity; and
a second sample hold circuit for sampling and holding a second voltage of the signal generated in the first electrode in a second period in which the AC signal has a second polarity opposite to the first polarity, and
wherein the electrical conductivity calculating portion calculates the electrical conductivity of the measurement target fluid based on the first voltage sampled by the first sample hold circuit and the second voltage sampled by the second sample hold circuit.

14. The electrical conductivity meter according to claim 1, further comprising:
a storing portion that stores a look-up table indicating a correspondence relationship between an amplitude of voltages detected by the voltage detecting portion and the electrical conductivity of the measurement target fluid,
wherein the electrical conductivity calculating portion reads the electrical conductivity of the measurement target fluid corresponding to a value of the amplitude of the voltages detected by the voltage detecting portion from the look-up table stored in the storing portion.

15. The electrical conductivity meter according to claim 1, wherein the second electrode is a pipe-shaped joint formed of a metal, of which one end is connected to the measurement tube and another end is connectable to an external pipe.

16. The electrical conductivity meter according to claim 1, further comprising:
a shield cover formed of a metal and disposed to face at least a part of the first electrode.

* * * * *